United States Patent
Katoh et al.

(10) Patent No.: US 10,483,586 B2
(45) Date of Patent: Nov. 19, 2019

(54) ALL-SOLID-STATE BATTERY USING SODIUM ION INTERCALATION CATHODE WITH LI/NA EXCHANGING LAYER

(71) Applicant: TOYOTA MOTOR EUROPE, Brussels (BE)

(72) Inventors: Yuki Katoh, Brussels (BE); Jun Yoshida, Bordeaux (FR)

(73) Assignee: TOYOTA MOTOR EUROPE, Brussels (BE)

( * ) Notice: Subject to any disclaimer, the term of this patent is extended or adjusted under 35 U.S.C. 154(b) by 76 days.

(21) Appl. No.: 15/771,566

(22) PCT Filed: Dec. 17, 2015

(86) PCT No.: PCT/EP2015/080301
§ 371 (c)(1),
(2) Date: Apr. 27, 2018

(87) PCT Pub. No.: WO2017/102011
PCT Pub. Date: Jun. 22, 2017

(65) Prior Publication Data
US 2018/0316056 A1   Nov. 1, 2018

(51) Int. Cl.
*H01M 6/18* (2006.01)
*H01M 10/0562* (2010.01)
*H01M 10/052* (2010.01)
*H01M 10/054* (2010.01)

(52) U.S. Cl.
CPC ..... *H01M 10/0562* (2013.01); *H01M 10/052* (2013.01); *H01M 10/054* (2013.01); *H01M 2300/0068* (2013.01); *H01M 2300/0091* (2013.01); *H01M 2300/0094* (2013.01)

(58) Field of Classification Search
CPC ........... H01M 10/0562; H01M 10/052; H01M 10/0525; H01M 10/054; H01M 2300/0068; H01M 2300/0091; H01M 2300/0094
See application file for complete search history.

(56) References Cited

U.S. PATENT DOCUMENTS

| | | | | |
|---|---|---|---|---|
| 2012/0301796 A1* | 11/2012 | Ohtomo | ............ | H01M 10/0562 429/322 |
| 2014/0099538 A1* | 4/2014 | Johnson | ................. | H01M 4/13 429/211 |
| 2014/0154585 A1 | 6/2014 | Hayashi et al. | | |

(Continued)

FOREIGN PATENT DOCUMENTS

| EP | 2 919 304 A1 | 9/2015 |
|---|---|---|
| JP | 2014-096261 A | 5/2014 |

(Continued)

OTHER PUBLICATIONS

Mar. 18, 2016 International Search Report issued in International Patent Application No. PCT/EP2015/080301.

(Continued)

*Primary Examiner* — Raymond Alejandro
(74) *Attorney, Agent, or Firm* — Oliff PLC

(57) ABSTRACT

An all-solid-state battery includes a mixture layer which has a physical mixture of a sulfide-based sodium-containing solid electrolyte material and a sulfide-based lithium-containing solid electrolyte material.

9 Claims, 3 Drawing Sheets

(56) References Cited

U.S. PATENT DOCUMENTS

| | | | |
|---|---|---|---|
| 2014/0308571 A1* | 10/2014 | Gaben | H01M 10/0562 |
| | | | 429/162 |
| 2015/0099188 A1* | 4/2015 | Holme | H01M 10/0525 |
| | | | 429/231.95 |
| 2015/0147659 A1 | 5/2015 | Kato | |
| 2015/0249263 A1 | 9/2015 | Takeuchi et al. | |
| 2015/0280215 A1 | 10/2015 | Nose | |

FOREIGN PATENT DOCUMENTS

| | | |
|---|---|---|
| JP | 2014-137892 A | 7/2014 |
| JP | 2015-002079 A | 1/2015 |
| JP | 2015-153647 A | 8/2015 |
| WO | 2014/010043 A1 | 1/2014 |

OTHER PUBLICATIONS

Nioguchi, Yoshinori, et al., "Fabrication and performances of all solid-state symmetric sodium battery based on NASICON-related compounds", Electrochimica Acta, vol. 101 (2013), pp. 59-65.

Wang, Yonggang, et al., "A new type rechargeable lithium battery based on a Cu-cathode", Electrochemistry Communications, vol. 11 (2009), pp. 1834-1837.

* cited by examiner

Example 1

Comp. Ex. 1

Comp. Ex. 2

ALL-SOLID-STATE BATTERY USING SODIUM ION INTERCALATION CATHODE WITH LI/NA EXCHANGING LAYER

FIELD OF THE INVENTION

The present invention relates to an all-solid-state battery comprising a mixture layer which comprises a physical mixture of a sulfide-based sodium-containing solid electrolyte material and a sulfide-based lithium-containing solid electrolyte material.

BACKGROUND ART

The solidification of the electrolyte provides an advantage for use in battery applications. In the case of the all-solid-battery system, the non-liquid nature of the electrolyte allows stacking of the battery cells in a single package without an ionic short circuit. Such a battery configuration decreases the dead-space between the single cells. In addition, this structure is suitable for applications requiring a high voltage and limited space, such as vehicle power sources.

In the basic structure of an exemplary all-solid-state battery the following layers are arranged in order: cathode current collector, cathode, solid electrolyte, anode, anode current collector. Further layers may be present—for example, a buffer layer may also be interposed at the cathode/solid electrolyte interface in order to enhance lithium-ion transfer at the interface, for a lithium all-solid-state battery.

As representative examples of known cathode active materials for lithium all-solid-state batteries, $LiCo_2$ and $LiFePO_4$ may be cited. The negative electrode active material may be, for example, a carbon active material or a metal/alloy-based active material.

Concerning the solid-state electrolyte for lithium all-solid-state batteries, a certain number of oxide-based or sulfide-based materials are known. Oxide-based solid electrolyte materials for lithium all-solid-state batteries typically contain Li and O, and often also a transition metal and/or metal/metalloid from group 13/14 of the Periodic Table (e.g. Al, Si, Ge), and/or phosphorus. Known materials in this context include LiPON (for example, $Li_{2.9}PO_{3.3}N_{0.46}$), LiLaTiO (for example, $Li_{0.34}La_{0.51}TiO_3$), LiLaZrO (for example, $Li_7La_3Zr_2O_{12}$). Compounds which have a NASICON mold structure can also be mentioned e.g. the compound denoted by general formula $Li_{1+x}Al_xGe_{2-x}(PO_4)_3$ (0≤x≤2), or the compound denoted by general formula $Li_{1+x}Al_xTi_{2-x}(PO_4)_3$ (0≤x≤2). Another possibility is a lithium borosilicate.

Concerning sulfide-based electrolyte materials for lithium all-solid-state batteries, known materials include ones containing Li, S, and commonly one or more of P, Si/Ge (also group 13 elements B, Al, Ga, In). Known possibilities include, for example, $Li_{10}GeP_2S_{12}$, $Li_2S$—$P_2S_5$ and $Li_2S$—$P_2S_5$—LiI, $Li_2S$—$P_2S_5$—$Li_2O$, $Li_2S$—$P_2S_5$-LO-LiI, $Li_2S$—$SiS_2$ and $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m and n being positive numbers, Z being Ge, Zn, or Ga), $Li_2S$—$GeS_2$ and $Li_2S$—$SiS_2$—$Li_3PO_4$, and $Li_2S$—$SiS_2$-$Li_xMO_y$ (where x and y are positive numbers, M is P, Si, Ge, B, aluminum, Ga, or In etc.) The description of the above "$Li_2S$—$P_2S_5$" refers to sulfide solid electrolyte materials which use the material composition containing $Li_2S$ and $P_2S_5$ in varying relative amounts, the same naming convention referring to other descriptions hereinabove.

The cathode materials of sodium ion batteries, for example sodium layered oxides ($Na_xMO_2$, where M is a transition metal) and polyanion systems $Na_xM_3(PO_4)_2P_2O_7$, where M is a transition metal) are expected materials for a positive electrode in respect of their high capacity and ion diffusivity, leading to high power batteries. However, because of the high potential of sodium, the voltage of battery is low. Therefore their energy density may be limited.

Noguchi et al., in *Electrochimica Acta* 101 (2013) 59-65, studied all solid-state sodium batteries. A symmetrical structure was studied with $Na_3Zr_2Si_2PO_{12}$ (NASICON) as solid electrolyte, and $Na_3V_2(PO_4)_3$ (NVP) as active electrode material (anode and cathode). However, only a relatively low voltage of about 2.0 V could be produced.

Wang et al., in *Electrochemistry Communications* 11 (2009) 1834-1837, studied a rechargeable lithium battery, in which a copper (Cu) cathode in an aqueous electrolyte and a Li-anode in a non-aqueous electrolyte are linked via a lithium super-ionic conductor glass film (LISICON). In this mixed system Li—Cu, the dissolution/deposition process of metallic Cu was used as the cathode reaction. A problem here is however that with a low ion density of the liquid electrolyte (1-2 mol $dm^{-3}$), there would be a low energy density of the battery.

SUMMARY OF THE INVENTION

The present invention has been carried out with a view to solving existing problems in the field of all-solid-battery systems. In particular, the present invention seeks to provide a solution to the issue of low voltage. In the invention, lithium-based anode materials may be used in a configuration of all-solid-state battery which shows an ion-exchanging function for a solid electrolyte layer. Thereby the voltage of battery may be increased. The present invention in particular proposes an idea of an electrochemical system with a Li/Na exchanging layer. Thanks to this layer, a Li/Na hybrid system can be operated.

In one aspect, the present invention thus relates to an all-solid-state battery comprising the following elements in order:
a positive electrode active material layer (5) comprising a sodium-containing cathode material;
a solid electrolyte layer (4) comprising a sulfide-based sodium-containing solid electrolyte material;
a sulfide-based mixture layer (3);
a solid electrolyte layer (2) comprising a sulfide-based lithium-containing solid electrolyte material;
a negative electrode active material layer (1) comprising a lithium-containing anode material,
wherein the mixture layer (3) comprises a physical mixture of a sulfide-based sodium-containing solid electrolyte material and a sulfide-based lithium-containing solid electrolyte material.

DETAILED DESCRIPTION OF THE INVENTION

As regards solid cathode materials, sodium layered oxides and poly-anion systems are expected to be appropriate materials for the positive electrode in respect of their high capacity and ion diffusivity, leading to high power batteries. As for the anode, lithium-based anodes have low redox potential compared to those of sodium based anodes. Combining these advantages, namely in a Li/Na hybrid system, much higher voltage of the battery system is expected.

For high energy, a high concentration of Li and Na in the electrolyte is important, and this can be achieved by using a solid electrolyte. For example, $Li_3PS_4$, $LiX-Li_3PS_4$ (X=Cl, Br, I), $Li_{10}SiP_2S_{12}$, $Li_{10}GeP_2S_{12}$, $Li_{10}SnP_2S_{12}$, $Li_6PS_5$ X (X=Cl, Br, I) or $Na_3PS_4$ can be used, providing a Li or Na concentration in the solid electrolyte about 35 to 50 mol $dm^{-3}$.

The "separator" part of the all-solid-state battery of the present invention, i.e. the part between the cathode and the anode, should here contain at least three distinct layers viz. Li solid electrolyte|Mixture layer|Na electrolyte. The function of each of the layers is as follows:
Li solid electrolyte: $Li^+$ passing,
Mixture layer: Li/Na exchange,
Na solid electrolyte: $Na^+$ passing The mixture layer in the present invention is prepared by physically combining Li-containing and Na-containing solids, most typically fine powders, homogenizing without heating, and so without chemical transformation. The inventors have found experimentally that heating to produce a chemically transformed Li/Na mixed solid does not enable the mixture layer to efficiently perform its role in an all-solid-state battery of the present invention.

Figure 1:
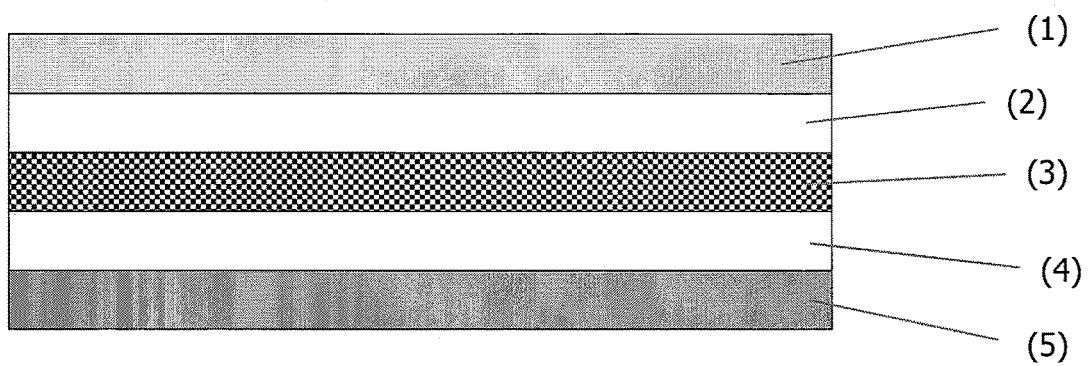
FIG. 1 shows a schematic view of an all-solid-state battery according to the present invention.

In the present invention, there is a solid electrolyte layer (layer 4 in FIG. 1) comprising a sulfide-based sodium-containing solid electrolyte material, a solid electrolyte layer (layer 2 in FIG. 1) comprising a sulfide-based lithium-containing solid electrolyte material, and between these two, a sulfide-based mixture layer (layer 3 in FIG. 1) comprising a physical mixture of a sulfide-based sodium-containing solid electrolyte material and a sulfide-based lithium-containing solid electrolyte material.

Sulfide-based electrolyte materials that can be used in the sulfide-based lithium-containing solid electrolyte material layer, and also as a lithium (Li)-providing component in the mixture layer, include ones containing Li, S, and commonly one or more of P, Si/Ge (also group 13 elements B, Al, Ga, In). Known possibilities include, for example, $Li_{10}GeP_2S_{12}$, $Li_2S-P_2S_5$ and $Li_2S-P_2S_5-LiI$, $Li_2S-P_2S_5-Li_2O$, $Li_2S-P_2S_5-Li_2O-LiI$, $Li_2S-SiS_2$ and $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (m and n being positive numbers, Z being Ge, Zn, or Ga), $Li_2S-GeS_2$ and $Li_2S-SiS_2-Li_3PO_4$, and $Li_2S-SiS_2-Li_xMO_y$ (where x and y are positive numbers, M is P, Si, Ge, B, aluminum, Ga, or In etc.). Another possibility in the present invention for a Li sulfide-based solid electrolyte layer, and for the Li part of the mixture layer, is $Li_{10}MP_2S_{12}$ (M=Si, Sn).

Thus, in a preferred all-solid-state battery according to the invention, the sulfide-based lithium-containing solid electrolyte material, contained in layer (2) and/or as part of the mixture layer (3), contains the element phosphorus (P) in addition to lithium (Li) and sulfur (S). Particularly, the sulfide-based lithium-containing solid electrolyte material, contained in layer (2) and/or as part of the mixture of layer (3), may appropriately be one or more selected from the group consisting of: $Li_3PS_4$, $LiX-Li_3PS_4$ (X=Cl, Br, I), $Li_{10}SiP_2S_{12}$, $Li_{10}GeP_2S_{12}$, $Li_{10}SnP_2S_{12}$, and $Li_6PS_5$ X (X=Cl, Br, I).

Sulfide-based electrolyte materials that can be used in the sulfide-based sodium-containing solid electrolyte material layer, as well as a sodium (Na)-providing component in the mixture layer, include $Na_3PS_4$, $Na_3PS_4-Na_4SiS_4$, $Na_2S-P_2S_5$, $Na_2S-SiS_2$, and $Na_2S-GeS_2$. Furthermore, sulfide-based sodium-containing materials for the sulfide-based sodium-containing solid electrolyte material layer may, in one aspect, include $LiI-Na_3PS_4$ or $LiBr-Na_3PS_4$.

Thus, in a preferred all-solid-state battery of the invention, the sulfide-based sodium-containing solid electrolyte material, contained in layer (4) and/or as part of the mixture of layer (3), contains, in addition to sodium (Na) and sulfur (S), one or more of the elements phosphorus (P), silicon (Si) and germanium (Ge). Particularly, the sulfide-based sodium-containing solid electrolyte material, contained in layer (4) and/or as part of the mixture of layer (3), may appropriately be one or more selected from the group consisting of: $Na_3PS_4$, $Na_3PS_4-Na_4SiS_4$, $Na_2S-P_2S_5$, $Na_2S-SiS_2$, and $Na_2S-GeS_2$.

In the present invention, in the mixture layer, it is preferred that the atomic ratio of Na:Li is y:1−y, wherein $0.1 \leq y \leq 0.9$, preferably $0.2 \leq y \leq 0.8$, and more preferably $0.3 \leq y \leq 0.7$.

In a preferred embodiment, the mixture layer comprises a mixture of $Na_3PS_4$ and $Li_3PS_4$. Here the weight ratio $Na_3PS_4:Li_3PS_4$ can appropriately be expressed as x:100−x (in wt %), wherein preferably $10 \leq x \leq 90$, more preferably $20 \leq x \leq 80$, and still more preferably $30 \leq x \leq 70$.

In the Li solid electrolyte layer, the Li/Na mixture layer, and the Na solid electrolyte layer, concerning the form of the solid electrolyte materials, examples include a particle shape, such as the shape of a true ball and the shape of an elliptical ball, or a thin film form, for example. When solid electrolyte materials have a particle shape, as for the mean particle diameter, it is preferable that their size is within the range of 50 nm to 10 micrometers, more preferably within the range of 100 nm to 5 micrometers.

Although it is preferable to have only one or more solid electrolyte materials as mentioned above in a solid electrolyte layer, this layer may also contain a binding agent if needed. As a binding agent used for a solid electrolyte layer, this may be of the same type as mentioned herein for the positive active material layer.

As regards the thickness of a solid electrolyte layer, although this may change with the kind of solid electrolyte materials, and the overall composition of an all-solid battery, generally it is preferable that this thickness is within the range of 0.1 micrometer to 1000 micrometers, more preferably within the range of 0.1 micrometer to 300 micrometers.

Concerning the positive active material (cathode active material) used for the present invention, which can be used in the positive electrode (cathode) active material layer, this is not especially limited if the average operating potential becomes more than 4 V (vs. $Na/Na^+$). As an average operating potential of positive active material, this is appropriately more than 4 V (vs. $Na/Na^+$), and it is preferable that it is within the limits of 4.0 V to 6.0 V, still more preferably within the limits of 4.5 V to 5.5 V. The average operating potential in the present invention can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 4 V (vs. Na/Na$^+$), there is no specific limitation, but it is preferable that the material is an oxide positive active material, which can have a high energy density.

A compound which has the layered type structure denoted by general formula NaMO$_2$ (M is at least one kind of transition metal element), as an example of positive active material, can be mentioned as an example. As regards M of the above-mentioned general formula NaMO$_2$, especially if it is a transition metal element, it will not be limited, but it is preferable that it is at least one kind chosen from the group which consists of Fe, Ni, Mn, Cr, Co, V, and Ti, for example, and it is more preferable that it is at least one kind chosen from the group which consists of Fe, Ni, Mn, and Co especially. Specifically, NaCoO$_2$, NaFeO$_2$, NaCrO$_2$, NaNi$_{0.5}$Mn$_{0.5}$O$_2$, Na$_{0.6}$MnO$_2$, Na$_{0.7}$CoO$_2$, Na$_{2/3}$Ni$_{1/3}$Mn$_{1/3}$O$_2$, Na$_{2/3}$Fe$_{1/3}$Mn$_{1/3}$O$_2$, NaCo$_{1/3}$Ni$_{1/3}$Mn$_{1/3}$O$_2$, NaFe$_{1/3}$Ni$_{1/3}$Mn$_{1/3}$O$_2$, Na$_{0.7}$Co$_{0.1}$Ni$_{0.3}$Mn$_{0.6}$O$_2$, Na$_{0.7}$Fe$_{0.1}$Ni$_{0.3}$Mn$_{0.6}$O$_2$, etc. can be mentioned. The compound which has the NASICON type structure denoted by general formula Na$_3$M$_2$(PO$_4$)$_3$ (M is at least one kind of transition metal element) as other examples of positive active material can be mentioned. M in the above-mentioned general formula will not be limited especially if it is a transition metal element, but it is preferable that it is at least one kind chosen from Fe, Ti, Cr, V, Mn, Co, Ni, for example, and it is more preferable that it is at least one kind chosen from the group which consists of Ti, V, and Cr especially. Specifically, Na$_3$V$_2$(PO$_4$)$_3$, Na$_3$Ti$_2$(PO$_4$)$_3$, Na$_3$Cr$_2$(PO$_4$)$_3$, etc. can be mentioned. The compound which has poly anion of P$_2$O$_7$ in its structure denoted by general formula Na$_x$M$_3$(PO$_4$)$_2$P$_2$O$_7$ (M is at least 1 type of a transition metal element) as other examples of positive active material can be mentioned. M in the above-mentioned general formula will not be limited especially if it is a transition metal element, but it is preferable that it is at least one kind chosen from Fe, Ti, Cr, V, Mn, Co, Ni, for example, and it is more preferable that it is at least one kind chosen from the group which consists of Co, Ni, and Mn especially. Specifically, Na$_x$Co$_3$(PO$_4$)$_2$P$_2$O$_7$ and Na$_x$(Co$_{0.33}$Ni$_{0.33}$Mn$_{0.33}$)$_3$(PO$_4$)$_2$P$_2$O$_7$, etc. can be mentioned. Na$_3$M$_2$(PO$_4$)$_2$F$_3$ (M is at least one kind of transition metal element) as other examples of positive active material can be mentioned. M in the above-mentioned general formula will not be limited especially if it is a transition metal element, but it is preferable that it is at least one kind chosen from Fe, Ti, Cr, V, Mn, Co, Ni, for example, and it is more preferable that it is at least one kind chosen from the group which consists of Ti, V, and Fe especially. Specifically, Na$_3$Ti$_2$(PO$_4$)$_2$F$_3$, Na$_3$Fe$_2$(PO$_4$)$_2$F$_3$, Na$_3$V$_2$(PO$_4$)$_2$F$_3$, etc. can be mentioned.

As regards the form of the positive active material, a particle shape, such as the shape of a true ball and the shape of an elliptical ball, thin film form, etc. can be mentioned, as an example. As for the mean particle diameter, when the positive active material has a particle shape, it is preferable that it is within the size range of 0.1 micrometer to 50 micrometers, for example. As for the content of the positive active material in a positive active material layer, it is preferable that it is in the range of 10% by weight to 99% by weight, for example, more preferably from 20% by weight to 90% by weight.

Concerning the positive active material layer, in addition to the positive active material mentioned above, if needed, the positive active material layer in the present invention may contain other materials, for example, solid electrolyte materials etc. As for the content of the solid electrolyte materials in a positive active material layer, it is preferable that this content is 1% by weight to 90% by weight, more preferably 10% by weight to 80% by weight.

Furthermore, a positive active material layer may contain an electrically conductive agent from a viewpoint of improving the conductivity of a positive active material layer, other than the solid electrolyte materials mentioned above. As electrically conductive material, acetylene black, Ketjen-black, a carbon fiber, etc. can be mentioned, for example. A positive active material may also contain a binding agent. As such a binding material (binding agent), fluorine-based binding materials, such as polyvinylidene fluoride (PVDF) and polytetrafluoroethylene (PTFE), etc. can be mentioned, for example.

Although the thickness of a positive active material layer may change according to the kind of all-solid-state battery made, it is generally preferable that it is within the range of 0.1 micrometer to 1000 micrometers.

As regards the negative electrode active material layer in the present invention, this layer at least contains one or more negative electrode active material(s), and may additionally contain at least one or more of solid electrolyte materials and electrically conductive agents if needed. For the all-solid-state batteries of the present, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, meso carbon micro beads (MCMB), highly ordered/oriented pyrolytic graphite (HOPG), hard carbon, soft carbon, etc. can be mentioned as examples. On the other hand, as a metal active material, charges of an alloy, such as Li alloy and Sn—Co—C, In, Al, Si, Sn, etc. can be mentioned as examples. Oxide stock materials, such as Li$_4$Ti$_5$O$_{12}$, can be mentioned as examples of other negative electrode active materials.

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 micrometer to 1000 micrometers.

An all-solid-state battery of the present invention has at least the positive active material layer, solid electrolyte layer, and negative electrode active material layer which were mentioned above. It further usually has a positive pole collector which collects a positive active material layer, and a negative pole collector which performs current collection of a negative electrode active material layer. As a material of a positive pole collector, for example, SUS, aluminum, nickel, iron, titanium, carbon, etc. can be mentioned, and SUS is especially preferable. On the other hand as a material of a negative pole collector, SUS, copper, nickel, carbon, etc. can be mentioned, for example, and SUS is especially preferable. Concerning the thickness, form, etc. of a positive pole collector and a negative pole collector, the person skilled in the art may choose suitably according to the use of the all-solid-state battery, etc. The cell case used for a common all-solid-state battery can be used as the cell case used for the present invention, for example, the cell case made from SUS, etc. can be mentioned. The all-solid-state battery of the present invention may form a power generation element in the inside of an insulating ring.

The all-solid-state battery of the present invention can be considered as a chargeable and dischargeable all-solid-state battery in a room temperature environment. Although it may be a primary battery and may be a rechargeable battery as an all-solid-state battery of the present invention, it is especially preferable that it is a rechargeable battery. Concerning the form of the all-solid-state battery, a coin type, a laminated type, cylindrical, a square shape, etc. can be mentioned, as examples.

As regards the manufacturing method of the all-solid-state battery of the present invention, this is not particularly limited, and common manufacturing methods of all-solid-state batteries can be used. For example, when an all-solid-state battery is thin film form, a positive active material layer can be formed on a substrate, the modification material layer mentioned above on the positive active material layer can be formed, and the method of forming a solid electrolyte layer and a negative electrode active material layer in order, and laminating them thereafter etc., may be used.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present invention, but the scope of the invention is not to be considered to be limited to the specific examples that follow.

Example 1

Synthesis of Solid Electrolytes $Na_3PS_4$ glass ceramics was synthesized with the starting materials of $Na_2S$ (Kojundo Chemical Lab.) and $P_2S_5$ (Aldrich). These were mixed at the weight ratio of 0.513:0.487 $Na_2S:P_2S_5$ and put into a zirconium pot (45 mL) with 10 zirconium balls (φ 10 mm) under Argon. The pot was closed and treated with planetary milling equipment (Fritsch, P7) at 370 rpm for 40 h to obtain the precursor. The precursor was sealed into the glass tube at the pressure of 30 Pa and then heated at 270° C. for 8 hours.

$Li_3PS_4$ glass was synthesized with the starting materials of $Li_2S$ (Nihon Chemical Industry) and $P_2S_5$ (Aldrich). These were mixed at the weight ratio of 0.383:0.717 $Li_2S:P_2S_5$ and put into the zirconium pot (45 mL) with 10 zirconium balls (φ 10 mm) under Argon. The pot was closed and treated with planetary milling equipment (Fritsch, P7) at 370 rpm for 40 h.

Fabrication of Electrochemical Cell

1. A mixture layer was fabricated by mixing $Na_3PS_4$ glass ceramics and $Li_3PS_4$ glass at 50:50 wt %. These were well mixed at room temperature without heating by using agate motor in an argon glovebox. The mixed powder of 65 mg was put into the alumina cylinder (φ 11.28 mm) and pressed to make the Mixture layer.

2. A Li solid electrolyte was fabricated on the mixture layer by applying and pressing the powder of $Li_3PS_4$ glass (65 mg).

3. Na solid electrolyte was fabricated as well as Li solid electrolyte but using $Na_3PS_4$ glass ceramics.

4. Sodium metal was placed on the Na solid electrolyte.

5. Each side was sandwiched by a stainless steel current collector to obtain the electrochemical cell.

Electrochemical Test

A cyclic voltammogram was obtained in a two-electrode system at the voltage range of −1 to 6 V (vs $Na/Na^+$). The scanning rate was 5 mV $sec^{-1}$. Current derived from the plating and stripping of Li on current collector was observed.

Comparative Example 1

The same materials as Example 1 were used, and the electrochemical cell was fabricated in the same way as in Example 1 but without the mixture layer.

An electrochemical test was performed in the same way as in Example 1, but only a very small current derived from the plating and stripping of Li on current collector was observed.

Comparative Example 2

The same materials as in Example 1 were used for the Li solid electrolyte and Na solid electrolyte layers. However, for the Mixture layer, the powder of mixed $Na_3PS_4$ glass ceramics and $Li_3PS_4$ glass (at 50:50 wt %) was heated at 400° C. for 8 h.

For the fabrication of an electrochemical cell, the mixture layer synthesized above was used for the cell and the other parts were same as in Example 1.

In the electrochemical test, carried out as in Example 1, only a very small current derived from the plating and stripping of Li on current collector was observed.

Figure 2:
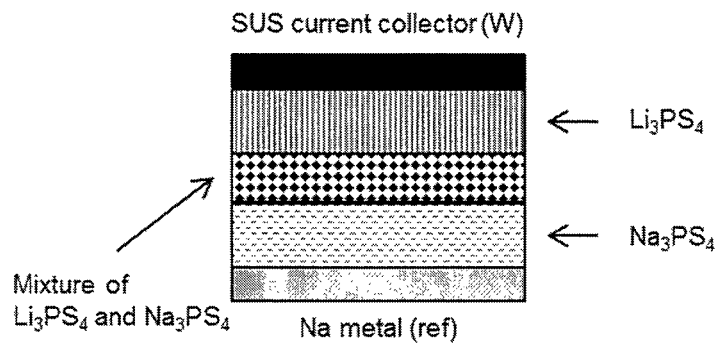
FIG. 2 shows schematically views of three exemplified all-solid-state batteries.
Figure 2:
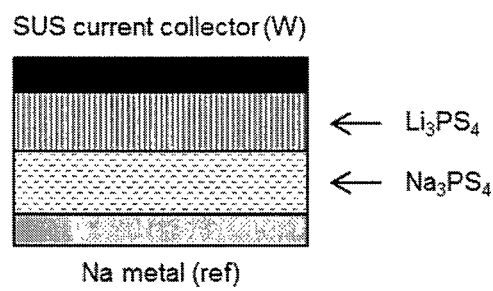
Figure 2:
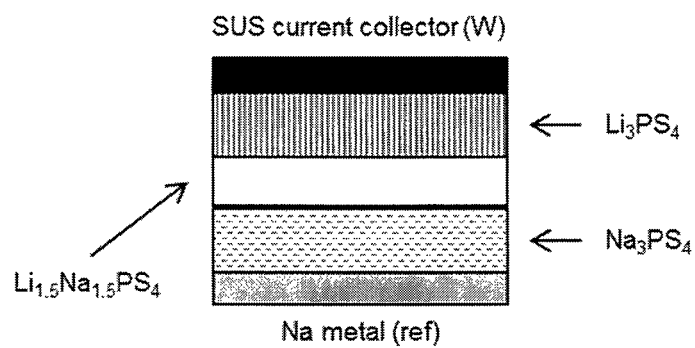

FIG. 2 shows schematically views of the three above-exemplified test all-solid-state batteries.

Figure 3:
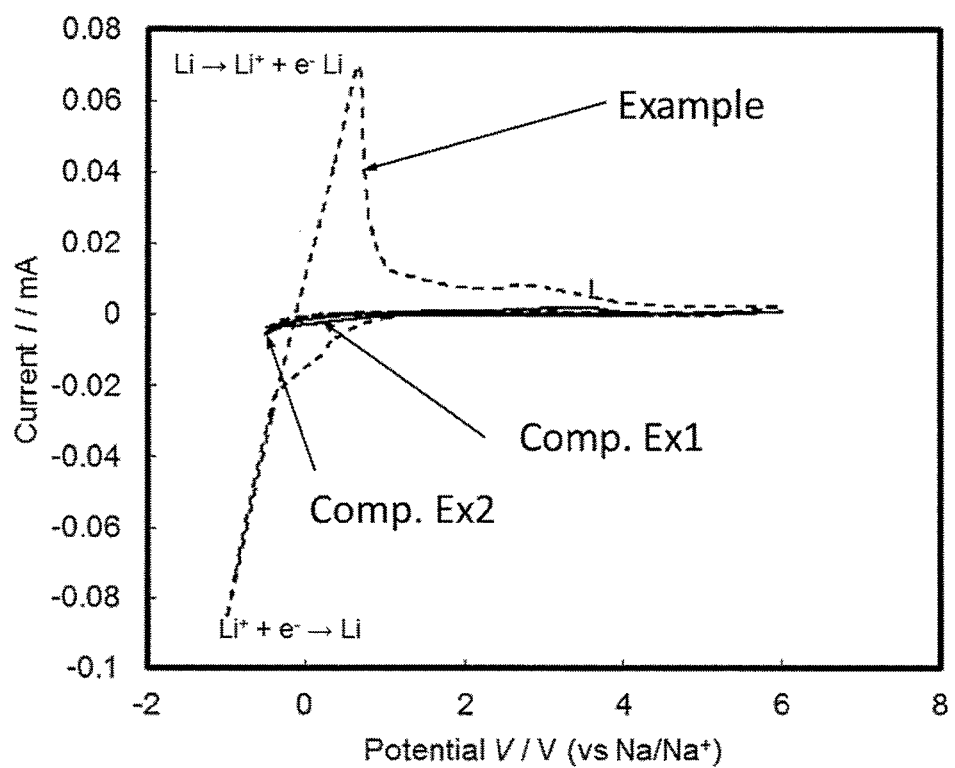
FIG. 3 shows the electrochemical test results of three exemplified all-solid-state batteries.

FIG. 3 shows the electrochemical test results of the three above-exemplified test all-solid-state batteries.

The invention claimed is:

1. An all-solid-state battery comprising the following elements in order:
   a positive electrode active material layer (5) comprising a sodium-containing cathode material;
   a solid electrolyte layer (4) comprising a sulfide-based sodium-containing solid electrolyte material;
   a sulfide-based mixture layer (3);
   a solid electrolyte layer (2) comprising a sulfide-based lithium-containing solid electrolyte material;
   a negative electrode active material layer (1) comprising a lithium-containing anode material,
   wherein the mixture layer (3) comprises a physical mixture of a sulfide-based sodium-containing solid electrolyte material and a sulfide-based lithium-containing solid electrolyte material.

2. The all-solid-state battery according to claim 1, wherein the sulfide-based sodium-containing solid electrolyte material, contained in layer (4) and/or as part of the mixture of layer (3), contains, in addition to sodium (Na) and sulfur (S), one or more of the elements phosphorus (P), silicon (Si) and germanium (Ge).

3. The all-solid-state battery according to claim 1, wherein the sulfide-based sodium-containing solid electrolyte material, contained in layer (4) and/or as part of the mixture of layer (3), is one or materials selected from the group consisting of: $Na_3PS_4$, $Na_3PS_4$—$Na_4SiS_4$, $Na_2S$—$P_2S_5$, $Na_2S$—$SiS_2$, and $Na_2S$—$GeS_2$.

4. The all-solid-state battery according to claim 1, wherein the sulfide-based lithium-containing solid electrolyte material, contained in layer (2) and/or as part of the mixture of layer (3), contains the element phosphorus (P) in addition to lithium (Li) and sulfur (S).

5. The all-solid-state battery according to claim 1, wherein the sulfide-based lithium-containing solid electrolyte material, contained in layer (2) and/or as part of the mixture of layer (3), is one or materials selected from the group consisting of: $Li_3PS_4$, $LiX$—$Li_3PS_4$ (X=Cl, Br, I), $Li_{10}SiP_2S_{12}$, $Li_{10}GeP_2S_{12}$, $Li_{10}SnP_2S_{12}$, and $Li_6PS_5X$ (X=Cl, Br, I).

6. The all-solid-state battery according to claim 1, wherein the atomic ratio of Na:Li is the mixture layer is expressed as y:1-y, wherein $0.1 \leq y \leq 0.9$.

7. The all-solid-state battery according to claim 1, wherein the mixture layer comprises a mixture of $Na_3PS_4$ and $Li_3PS_4$, and the weight ratio $Na_3PS_4:Li_3PS_4$ expressed as x 100-x (in wt %) is $10 \leq x \leq 90$.

8. The all-solid-state battery according to claim 1, wherein the sodium-containing cathode material of the positive electrode active material layer (5) is one or materials selected from the group consisting of: a compound which has a layer structure denoted by general formula $NaMO_2$, wherein M is at least one kind of transition metal element, Ni, Mn, and/or Co; a compound denoted by general formula $Na_3M_2(PO_4)_3$, wherein M is at least one kind of transition metal element, V, and/or Cr; a compound which has a polyanion of $P_2O_7$ in its structure denoted by general formula $Na_xM_3(PO_4)_2P_2O_7$ wherein M is at least one kind of transition metal element, Ni and/or Mn; a compound which has a fluorine in its structure denoted by general formula $Na_3M_2(PO_4)_2F_3$ wherein M is at least one kind of transition metal element.

9. The all-solid-state battery according to claim 1, wherein the lithium-containing anode material of the negative electrode active material layer (1) is one or materials selected from the group consisting of: carbon active material; black lead; meso carbon micro beads (MCMB); highly ordered/oriented pyrolytic graphite (HOPG); hard carbon; soft carbon; an alloy; In; Al; Si; Sn; oxide stock materials.

* * * * *